United States Patent [19]
Binder et al.

[11] Patent Number: 6,003,961
[45] Date of Patent: Dec. 21, 1999

[54] METHOD AND APPARATUS FOR CONTROLLING A BRAKING SYSTEM OF A VEHICLE

[75] Inventors: Juergen Binder, Stuttgart; Eberhardt Schunck, Landau; Ulrich Gottwick, Stuttgart; Michael Schubert, Althengstett, all of Germany

[73] Assignee: Robert Bosch GmbH, Stuttgart, Germany

[21] Appl. No.: 09/026,733

[22] Filed: Feb. 20, 1998

[30] Foreign Application Priority Data

Feb. 21, 1997 [DE] Germany .......................... 197 06 850

[51] Int. Cl.⁶ .................................................. B60T 13/10
[52] U.S. Cl. ............... 303/191; 188/1.11 R; 188/264 R; 303/3; 303/68; 303/115.1; 303/122; 303/113.4; 303/155
[58] Field of Search .............................. 303/115.2, 115.1, 303/191, 155, 113.4, 122.11, 166, 167, DIG. 3, DIG. 4, 3, 13–15, 199, 20, 119.2, 68, 69, 145, 122, 157; 701/71, 75, 70, 83; 188/264 R, 156, 158, 71.6, 1.11 R, 1.11 E

[56] References Cited

U.S. PATENT DOCUMENTS

| | | | |
|---|---|---|---|
| 3,610,702 | 10/1971 | MacDuff | 303/115.1 |
| 3,729,169 | 4/1973 | MacDuff | 303/119.2 |
| 3,731,767 | 5/1973 | Lefort | 303/61 |
| 3,774,978 | 11/1973 | Staunton et al. | 303/89 |
| 4,018,314 | 4/1977 | Richmond et al. | 303/89 |
| 4,283,092 | 8/1981 | Sauka et al. | 188/156 |
| 4,417,768 | 11/1983 | Satoh et al. | 303/115.4 |
| 4,477,124 | 10/1984 | Watanabe | 303/191 |
| 4,546,846 | 10/1985 | Myers | 303/89 |
| 4,685,745 | 8/1987 | Reinecke | 303/191 |
| 4,725,104 | 2/1988 | Yardley | 303/115.6 |
| 4,762,300 | 8/1988 | Inagaki et al. | 303/115.2 |
| 4,790,606 | 12/1988 | Reinecke | 303/191 |
| 5,056,313 | 10/1991 | Venetos et al. | 303/113.1 |
| 5,136,508 | 8/1992 | Bannon et al. | |
| 5,184,875 | 2/1993 | Wrede | 303/3 |
| 5,187,666 | 2/1993 | Watanabe | |
| 5,219,442 | 6/1993 | Burgdorf et al. | 303/113.4 |
| 5,346,292 | 9/1994 | Hall | |
| 5,462,342 | 10/1995 | Goebels | 303/3 |
| 5,498,070 | 3/1996 | Inagawa et al. | 303/3 |
| 5,524,974 | 6/1996 | Fischle et al. | 303/191 |
| 5,584,543 | 12/1996 | Sawada | 303/191 |
| 5,630,656 | 5/1997 | Stewart, Jr. | 303/113.5 |
| 5,632,533 | 5/1997 | Kullman et al. | 303/113.5 |
| 5,685,619 | 11/1997 | Brown | 303/191 |
| 5,731,975 | 3/1998 | Nakashima | 303/191 |
| 5,735,585 | 4/1998 | Kuike et al. | 303/191 |
| 5,806,938 | 9/1998 | Stumpe et al. | 303/3 |

FOREIGN PATENT DOCUMENTS

| | | |
|---|---|---|
| 489 887 | 6/1992 | European Pat. Off. . |
| 40 37 662 | 6/1992 | Germany . |

OTHER PUBLICATIONS

SAE Paper 960991, Electrohydraulic Brake System—The First Approach to Brake–By–Wire Technology, Feb. 1996.

*Primary Examiner*—Douglas C. Butler
*Attorney, Agent, or Firm*—Kenyon & Kenyon

[57] ABSTRACT

A method and an apparatus for controlling a braking system of a vehicle. The braking action is established or regulated at at least one wheel brake, by electrical structure, as a function of a driver's braking input. A capability for conventional action by the driver is cut off by a valve. A pressure medium is enclosed in a portion of the braking system. In at least one operating state in which an expansion in the volume of the enclosed medium may be expected, the valve is briefly opened in order to reduce the expansion in volume.

11 Claims, 5 Drawing Sheets

6,003,961

METHOD AND APPARATUS FOR CONTROLLING A BRAKING SYSTEM OF A VEHICLE

FIELD OF THE INVENTION

The present invention relates to a method and an apparatus for controlling a braking system of a vehicle.

BACKGROUND INFORMATION

Braking systems are known in which, in at least one operating mode (for example in an operating mode in which the wheel brakes are controlled electrically as a function of the driver's braking input), the pressure medium is enclosed (cf. for example German Patent No. DE 40 37 662). In the case of long braking operations, for example continuous braking downhill, the volume of the enclosed pressure medium expands as a result of heating in the wheel brake cylinders. Because the enclosed volume generates a minimum braking pressure, it is possible for the thermal expansion in volume to become so great that the pressure in the wheel brakes can no longer be reduced to very low pressures. It is an object of the present invention to ensure that brake pressure can be reduced to very low pressures even when braking continues for an extended period in braking systems having a trapped volume of brake fluid.

SAE Paper 960991, Electrohydraulic Brake System—The First Approach to Brake-By-Wire Technology, by Wolf-Dieter Jonner, Hermann Winner, Ludwig Dreilich and Eberhardt Schunck, describes an electrohydraulic braking system in which the driver's input is detected, for example by means of a pedal travel and/or by means of a pressure sensor; setpoints for the brake controller are formed therefrom; and the pressures at the wheel brakes are set so that the actual values approach the setpoints. In the event of failure of this electronic controller, hydraulic or pneumatic pathways are opened for a conventional direct action by the driver on the wheel brake pressure. Enclosed pressure medium volumes which can lead to the aforementioned disadvantages can also occur with a braking system of this kind.

It is also known from European Patent No. EP 489 887 to estimate the temperature of a wheel brake.

SUMMARY OF THE INVENTION

The present invention prevents enclosed volumes of a pressure medium of a braking system from leading to restricted operation of the braking system. The present invention is particularly advantageous in conjunction with an electronically controlled hydraulic braking system which includes, in the event of a fault in the electrical system, a back-up conventional hydraulic driver action capability.

Additional valves can be dispensed with, so that greater complexity does not result and conventional hydraulic action by the driver is guaranteed in the event of a fault in the electronic controller.

The distribution of the pulses effecting the reduction in expansion in volume is advantageous in terms of convenience, since feedback into the main brake cylinder of the braking system is reduced. It is also advantageous that the feedback effects on the pedal which may possibly be present are, as a result of the present invention, taken into account in determining the driver's braking input for the electronic controller of the braking system and/or in monitoring the function of the main brake cylinder. Improved accuracy is achieved by using a temperature model in determining the opening pulses.

DETAILED DESCRIPTION

Figure 1:
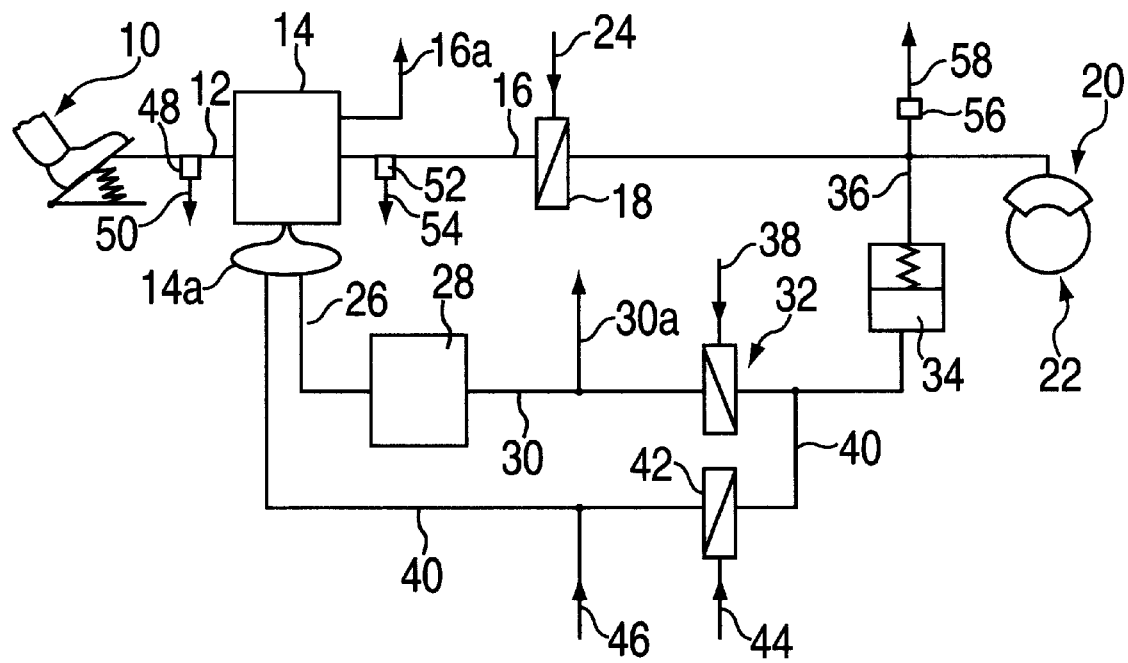
FIG. 1 illustrates a block diagram of an electronically controlled braking system with conventional action capability by the driver in the event of malfunction using the example of a wheel brake.

FIG. 1 is a general diagram sketching a portion of an electrically controlled hydraulic braking system. For reasons of clarity, the braking system is shown therein only with reference to one wheel brake, and the other wheel brake on the same axle is indicated. Corresponding systems can also be provided for the wheel brakes of the further axles of the vehicle. The character 10 represents a brake pedal which is connected via a mechanical connection 12 to a main brake cylinder 14. Connected to the main brake cylinder, which comprises a reservoir 14a for the brake fluid, is a first hydraulic line 16, which leads via an electrically controllable cutoff valve 18 to wheel brake cylinder 20 of wheel 22 that is depicted. Cutoff valve 18 can be actuated, via an electrical line 24, by an electronic control unit (not depicted). Branching off from the main brake cylinder or from line 16 is a line 16a which leads to the wheel brake cylinder of the second wheel on the same axle. When cutoff valve 18 is open, actuation of brake pedal 10 by the driver causes hydraulic fluid to be forced via main brake cylinder 14 into wheel brake cylinder 20 in the conventional manner, generating the braking effect. In addition, an electronic controller for the braking system is provided, in which the driver, by actuating the brake pedal, defines a braking input which is implemented, for example in the context of a pressure regulating system, by the electronic control unit at the wheel brakes of the vehicle. A further hydraulic line 26, which is pressureless and proceeds from reservoir 14a of main brake cylinder 14, is provided for this purpose. It leads to a pressure generator 28, in particular to a pressure-generating pump. From this a hydraulic line 30 leads via an inlet valve 32 to a media separator 34. The other connection of media separator 34 is connected to a line 36 which leads to line 16 between cutoff valve 18 and wheel brake cylinder 20. Inlet valve 32 is activated, via an electrical line 38, by the control unit (not depicted). Also proceeding from line 30 between pump 28 and valve 32 is a line 30a to the wheel brake of the other wheel on the same axle. From line 30 between valve 32 and media separator 34, a further line 40 leads to an electrically controllable valve 42 that is actuated, via an electrical line 44 from the control unit (not depicted).

Line 40 leads, via the valve, as a return line back to reservoir 14a of main brake cylinder 14. A line 46 enters between valve 42 and main brake cylinder 14 as a return line from the wheel brake of the other wheel on the same axle.

In the preferred exemplary embodiment, there is provided in the vicinity of brake pedal 10 a sensor 48 which delivers, via a line 50, a magnitude representing the brake pedal position; in the vicinity of main brake cylinder 14 a sensor 52 which delivers, via a line 54, a magnitude representing the inlet pressure in hydraulic line 16; and in the vicinity of the wheel brake cylinder a sensor 56 which delivers, via a line 58, a magnitude representing the brake pressure.

In the electrically controlled mode, there is formed from the signal of pedal position sensor 48 and/or of pressure sensor 52 a driver's braking input which is converted into pressure setpoints for each wheel. The pressure setpoints are conveyed to pressure control circuits. The latter, by actuating inlet and outlet valves for pressure buildup, pressure reduction, and pressure holding, regulate the brake pressures present in the wheel brakes to the particular setpoint. Media separator 34, which separates the hydraulic emergency circuit with brake line 16 from the electrically controlled hydraulic circuit with lines 30 and 40, is provided to improve the operation of the braking system. It effectively prevents air or gas contamination of the emergency circuit by gas dissolved in the brake fluid. The media separators separate brake line 16 from the potentially gas-contaminated regions of brake lines 30 and 40.

In the normal, electrically controlled mode, the closing of cutoff valve 18 causes a volume of brake fluid to be trapped in the region of brake line 16 between cutoff valve 18 and wheel brake cylinder 20. The brake fluid trapped therein can expand upon heating. Such heating takes place in the wheel brake cylinder during an extended period of braking. In the case of extended braking (for example, continuous braking downhill), the thermal expansion in volume is so great that the system is no longer capable of reducing the pressure in the wheel brake to very low pressures (e.g. to 5 bar during an ABS action on low-$\mu$ road surfaces) by moving the media separator piston back. Upon release of the brakes, not until the cutoff valve opened would the trapped residual pressure suddenly be released, thus degrading metering accuracy; in the case of an ABS on a low-$\mu$ surface, the wheel would lock.

Figure 2:
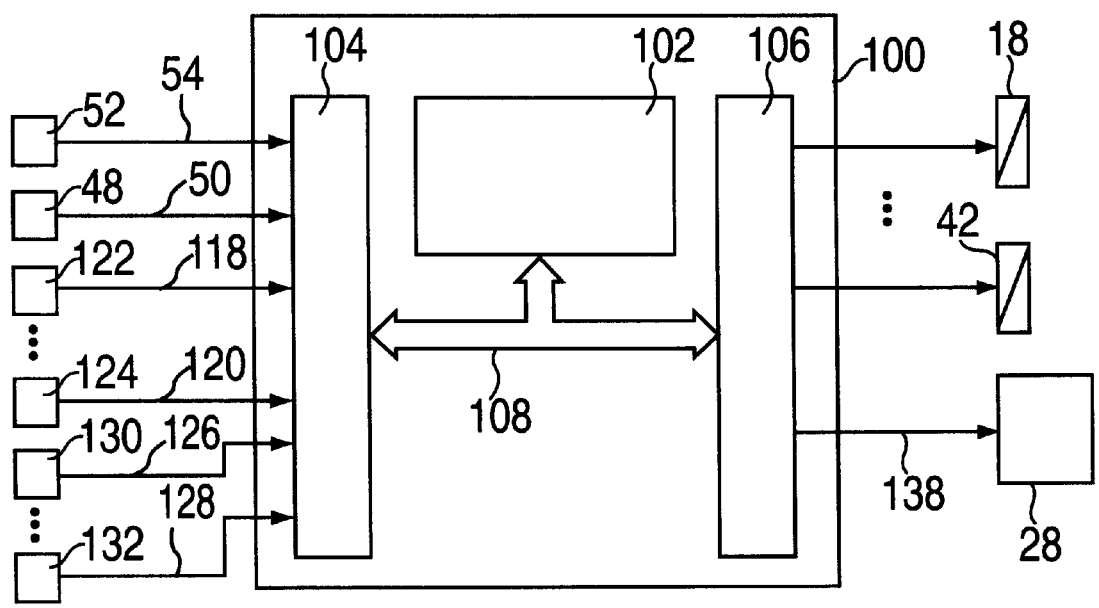
FIG. 2 illustrates the structure of the electronic control unit for controlling a braking system, according to an embodiment of the present invention.

FIG. 2 schematically depicts the control unit (not depicted in FIG. 1) for controlling the braking system. Control unit 100 comprises at least one microcomputer 102, an input circuit 104, an output circuit 106, and a bus system which connects these elements for mutual data interchange. Lines 50 and 54 are conveyed to input circuit 104. In addition, input lines 118 to 120 connect input circuit 104 to sensors 122 to 124, associated with each wheel brake, for detecting the wheel braking pressures (including sensor 56 and line 58). Further input lines 126 to 128 connect input circuit 104 to measurement devices 130 to 132 for detecting further operating magnitudes of the braking system, the vehicle, or its drive unit. Such operating magnitudes are, for example, the wheel velocities, optionally the engine torque output by the drive unit, axle loads, etc. A plurality of output lines are connected to output circuit 106. The output lines shown by way of example are those via which valves 18, 32, 42, etc. are actuated. Pump 28 is activated via a further output line 138.

The manner of operation of an electronically controlled hydraulic braking system equipped as shown in FIGS. 1 and 2 is known from the existing art cited initially. In order to govern possible expansion in the volume of the trapped volume of brake fluid due to heating, and avoid the disadvantages associated therewith, provision is made for counting the duration of a braking action with closed cutoff valves. If this duration exceeds a minimum time after which the first expansion effects may be expected, a corresponding additional volume is bled off from the enclosed region of the braking system by appropriate brief opening of the cutoff valve—or, in the case of a second controlled brake circuit, of the cutoff valves—in the direction of the main brake cylinder. Since the cutoff valves generally close when electrically activated and open when electrical activation is absent, the additional volume is bled off by appropriate brief non-activation of the valves. When the volume is reduced, the pressure also drops slightly. The pressure regulator must therefore react very quickly in terms of its control strategy so that this pressure fluctuation remains imperceptible to the driver. Advantageously, therefore, the two cutoff valves are pulsed in succession rather than simultaneously.

Figure 3:
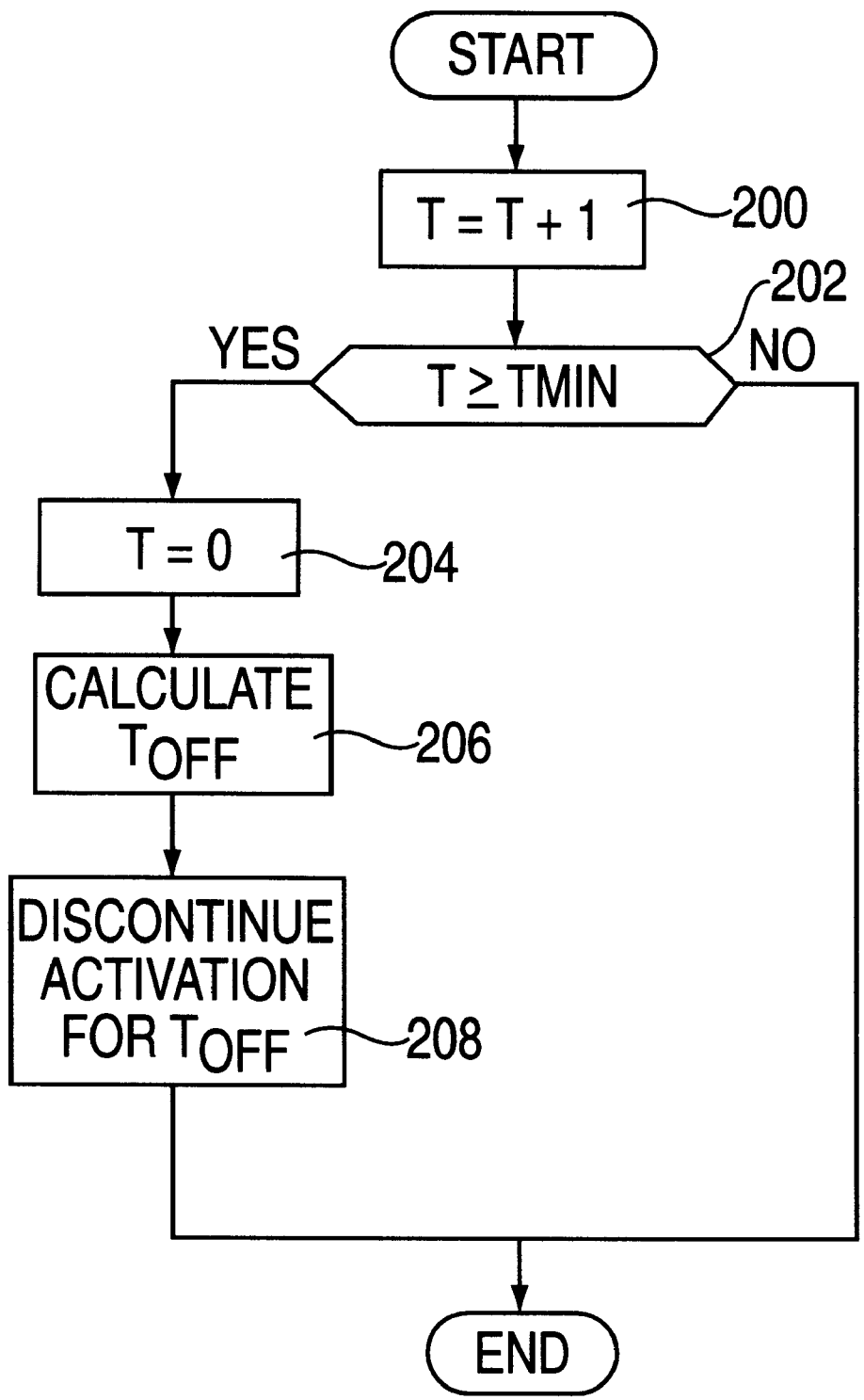
FIG. 3 is a flow diagram illustrating a program which can be run in the control unit to manage the enclosed expanding volumes of pressure medium in a braking system.

One example of a procedure for carrying out this solution is depicted in the flow diagram in FIG. 3. The program depicted is run at defined times during a braking action when the brake pedal is actuated. When braking begins and the cutoff valves close, in the first step 200 a counter T, which at the beginning of the braking action is set to zero, is incremented. In the subsequent step 202, said counter is compared with a defined value $T_{min}$. If the count is less than that value, the program segment is terminated and is restarted at the next point in time. If the count has reached the defined minimum value, then in step 204 the counter is set to zero; in step 206 the non-activation time $T_{off}$ of the cutoff valve(s) is calculated, and is output in the following step 208. After step 208 the program segment is terminated and, at a specific time, re-initiated with a restarted counter. To prevent too much brake fluid from being bled off (the volume is bled off via cutoff valve; the pressure regulator advances the media separator piston and can no longer build up locking pressure after multiple repetitions), the volume reduction is limited (e.g. counting the pulses and comparing with a maximum value). It is important that in the partial braking regime, the pressure is different in front of and behind the cutoff valve, the pressure in front of the cutoff valve specifically being lower. As a result, a pressure reduction occurs when the valve opens. The braking system is normally designed so that brake pressures are lower in the main brake cylinder than in the pressure regulation circuit, so that a gradient with the correct sign is present. The situation could be reversed during an ABS regulating action (main cylinder pressure higher, wheel pressure lower). The pressure in the wheel is then briefly (<200–500 ms) increased, and the volume is reduced as above. The wheel does lock briefly, but sufficient volume has thereafter been bled off so that the wheel pressure can be reduced again to 0 bar.

For calculating the non-activation time $T_{off}$, provision is made for determining the off times as a function of the pressure difference at the valve, which is substantially known from the measured variables for inlet pressure and brake pressure, in accordance with the known flow rate parameters of the cutoff valves. The off period is determined in such a way that the expansion in volume that has occurred, on the basis of experience, for the corresponding braking action length ($T_{min}$) is reduced. The corresponding values are determined experimentally in tests and stored in a table. If braking continues, the volume reduction can be repeated.

It is particularly advantageous that the activation off period is divided into many small pulses, thus reducing feedback into the main brake cylinder and thereby improving convenience. Another possibility for improving convenience is to use what are called LMV valves, in which the pressure pulsation is minimized by suitable activation.

The volume reduced by opening the cutoff valves pushes the main brake cylinder back if the connection to the brake fluid reservoir is closed off by a sufficiently strong actuation of the brake pedal. With smaller stroke lengths the connection is not yet closed off, i.e. brake fluid can flow out through the main brake cylinder into the reservoir. No feedback then occurs.

In addition to determining the activation off periods after a minimum time, in another advantageous exemplifying embodiment a calculation model is used for the expansion in volume in the enclosed region, the expansion in volume being continuously calculated. The basis of the model is the temperature model, known from the existing art cited initially, for the wheel brakes. The typical expansion in volume for the brake fluid is then estimated from the temperature of the wheel brakes. The knowledge of the change in volume of the brake fluid with temperature that is required for this is determined, if applicable, experimentally. The volumetric conditions are thus continuously calculated. The off time of the activation system is calculated from the increase in volume due to thermal expansion, and from the decrease in volume resulting from periodic opening of the cutoff valves.

Figure 4A:
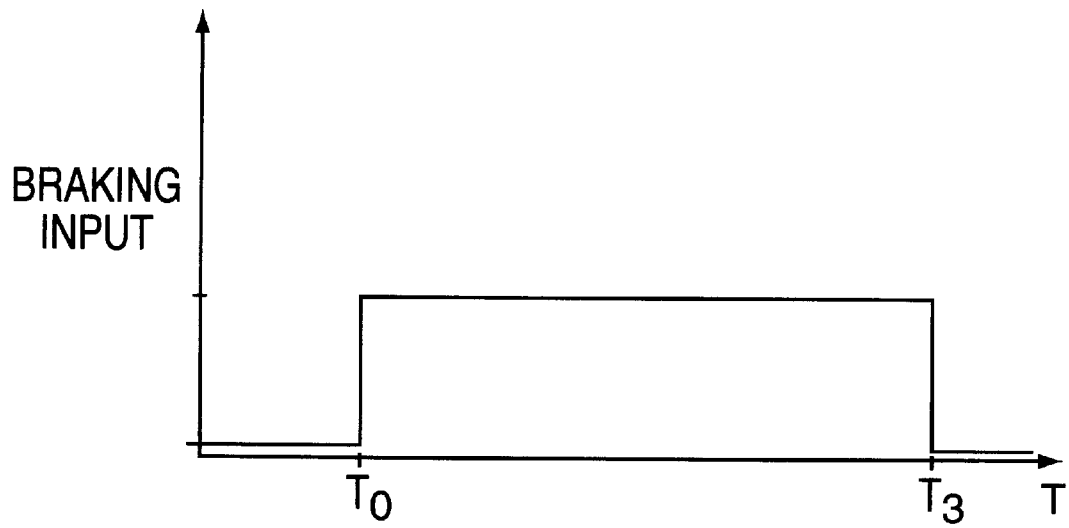
FIG. 4a illustrates a driver's braking input derived from sensors, according to an embodiment of the present invention.
Figure 4B:
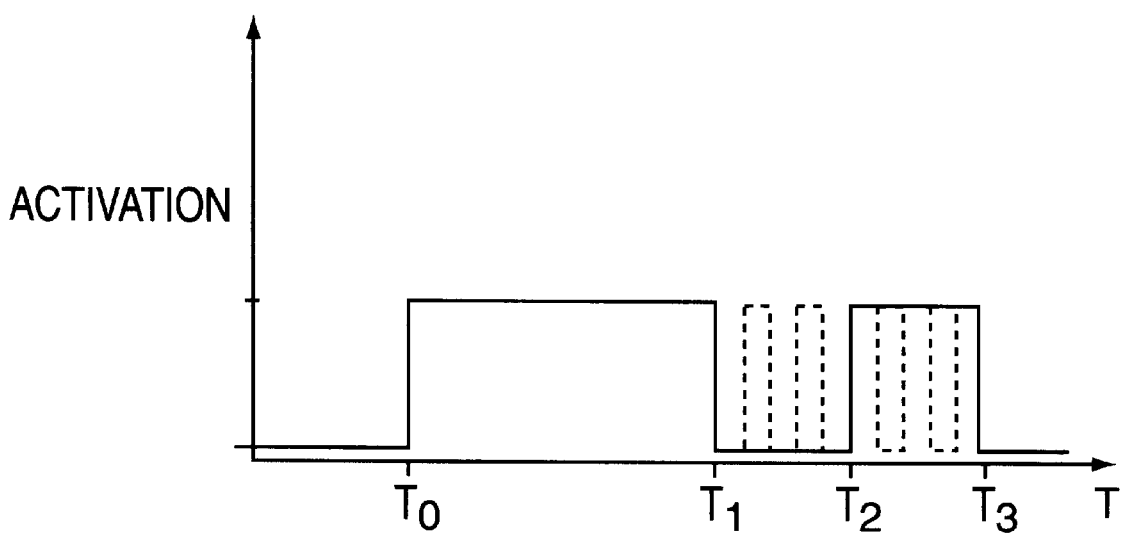
FIG. 4b illustrates the effects of the program of FIG. 3 in response to the driver's braking input of FIG. 4a, according to an embodiment of the present invention.

FIGS. 4a and 4b use time diagrams to depict the manner in which the apparatus according to the present invention functions. FIG. 4a depicts the driver's braking input, which can be derived from the sensors; FIG. 4b depicts the activation of a cutoff valve. At time T0 the braking operation begins as the driver actuates the brake pedal. At the same time (T0), the cutoff valve is activated and thus closed. At time T1 the minimum time is assumed to have been exceeded, and the increase in volume is assumed to be such that opening of the cutoff valve is advisable. This is done between times T1 and T2, in accordance with the calculation of the off time $T_{off}$. At time T2 the cutoff valve is closed again. At time T3 the driver has released the brake pedal, whereupon the cutoff valve is opened by discontinuing activation. Alternatively, FIG. 4b depicts the division of the opening pulse $T_{off}$ into multiple small pulses in order to improve driving convenience.

The volume reduced through the cutoff valves pushes the main brake cylinder piston back. The result is either that the driver must increase the pedal force for the same pedal travel, or that the driver's foot is pushed back if pedal force remains constant. In an advantageous embodiment of the present invention, this is to be taken into account in implementing the driver's braking input.

Figure 5:
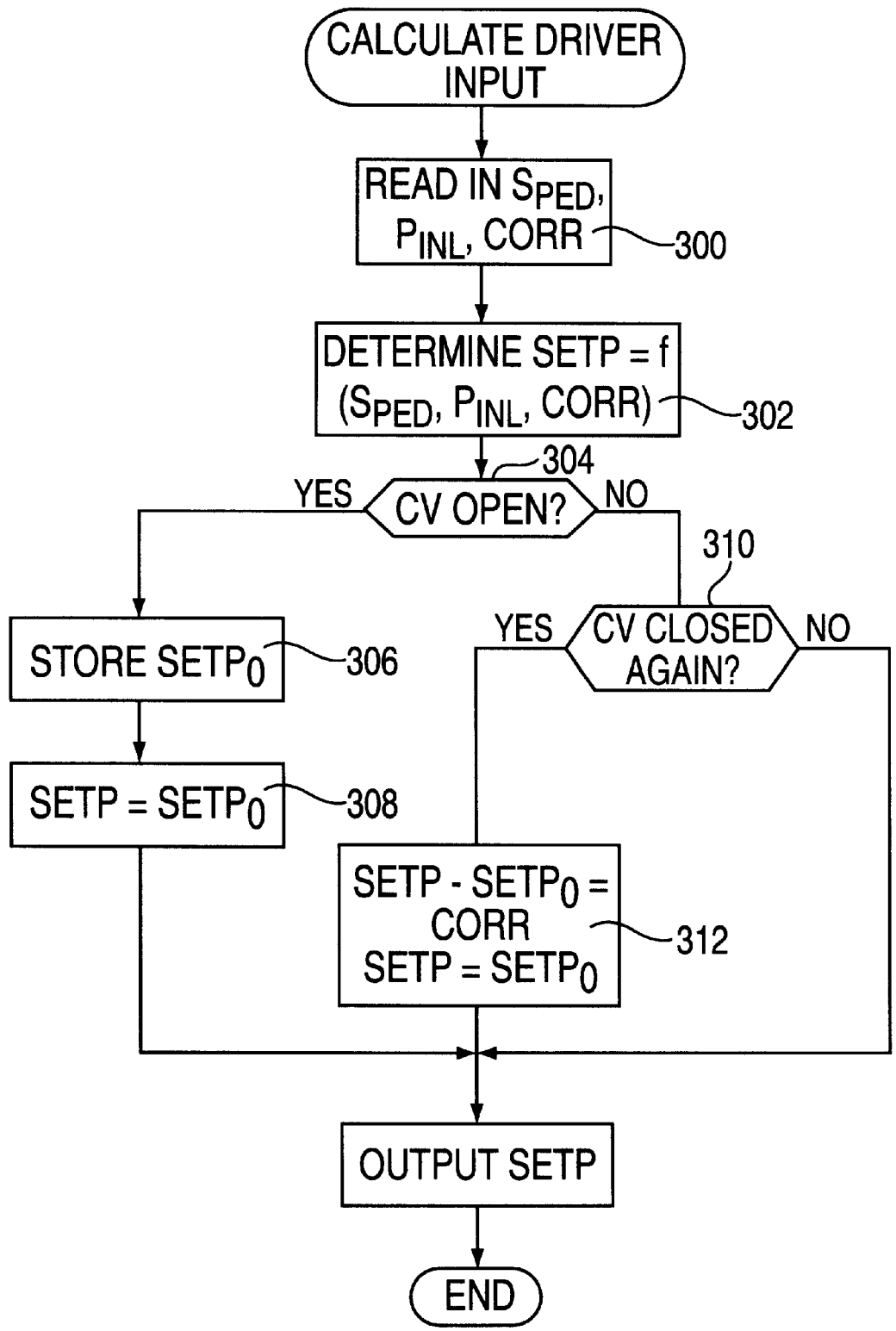
FIG. 5 is a flow diagram illustrating a driver input calculation with reference to a flow diagram, according to an embodiment of the present invention.

A corresponding exemplary T embodiment according to the present invention, in the form of a program of the electronic control unit, is depicted in the flow diagram shown in FIG. 5. The program for calculating the driver's input is run at defined points in time. In the first step 300 the basic magnitudes for calculating driver input—in particular pedal travel $S_{ped}$, inlet pressure $P_{inl}$, and optionally axle loads, wheel velocities, etc.—are read in. In the subsequent step 302, the setpoint SETP representing the desired braking effect is determined as a function of the pedal travel $S_{ped}$ and/or inlet pressure $P_{inl}$ and of a correction CORR, determined as described below, which is initially zero. The setpoint can be a pressure setpoint, braking torque setpoint, braking force setpoint, deceleration setpoint, etc. In the next step 304 a check is made as to whether the cutoff valve(s) is/are open (or is/are being activated in pulsed fashion as defined by the present invention). This is done by way of corresponding markers which are set upon opening of the valve(s), when volume is being reduced via the cutoff valves as defined by the solution according to the present invention. If so, in step 306 the current setpoint is stored as a basic setpoint $SETP_0$. In the subsequent step 308, the setpoint is maintained at this basic setpoint $SETP_0$ during the opening period of the cutoff valve(s). The setpoint is then output and the program is terminated. If, in step 304, the valve(s) is/are not open, in step 310 a check is made as to whether the valve(s) has/have been closed again after its/their opening position, i.e. whether the volume reduction has just been completed. If not, the setpoint calculated in step 302 is output and the program is terminated. If the volume reduction is complete, in step 312 the correction value CORR is calculated from the difference between the stored setpoint $SETP_0$ before the volume reduction and the setpoint after the volume reduction, and is taken into account in future driver input calculations during the current braking operation. After step 312 the stored value $SETP_0$ is output and the program is terminated.

The correction value, in this context, corresponds to the effect of the volume reduction on the brake pedal, and is determined so that when the pedal is pushed back or when the pedal force is increased, the braking effect remains constant regardless of the volume reduction. If a change in driver input is present that is not attributable to the volume reduction (e.g. a stronger actuation of the pedal), steps 304 to 312 are omitted and the setpoint calculated in step 302 is output. This correction is performed only if $S_{ped} > S_{pedmin}$, since otherwise there is no feedback into the $S_{ped}/P_{inl}$ correlation.

If the volume reduction is performed even for short main brake cylinder stroke lengths, during which the central valves of the main brake cylinder are open, feedback to the pedal and the driver is diminished.

Figure 6:
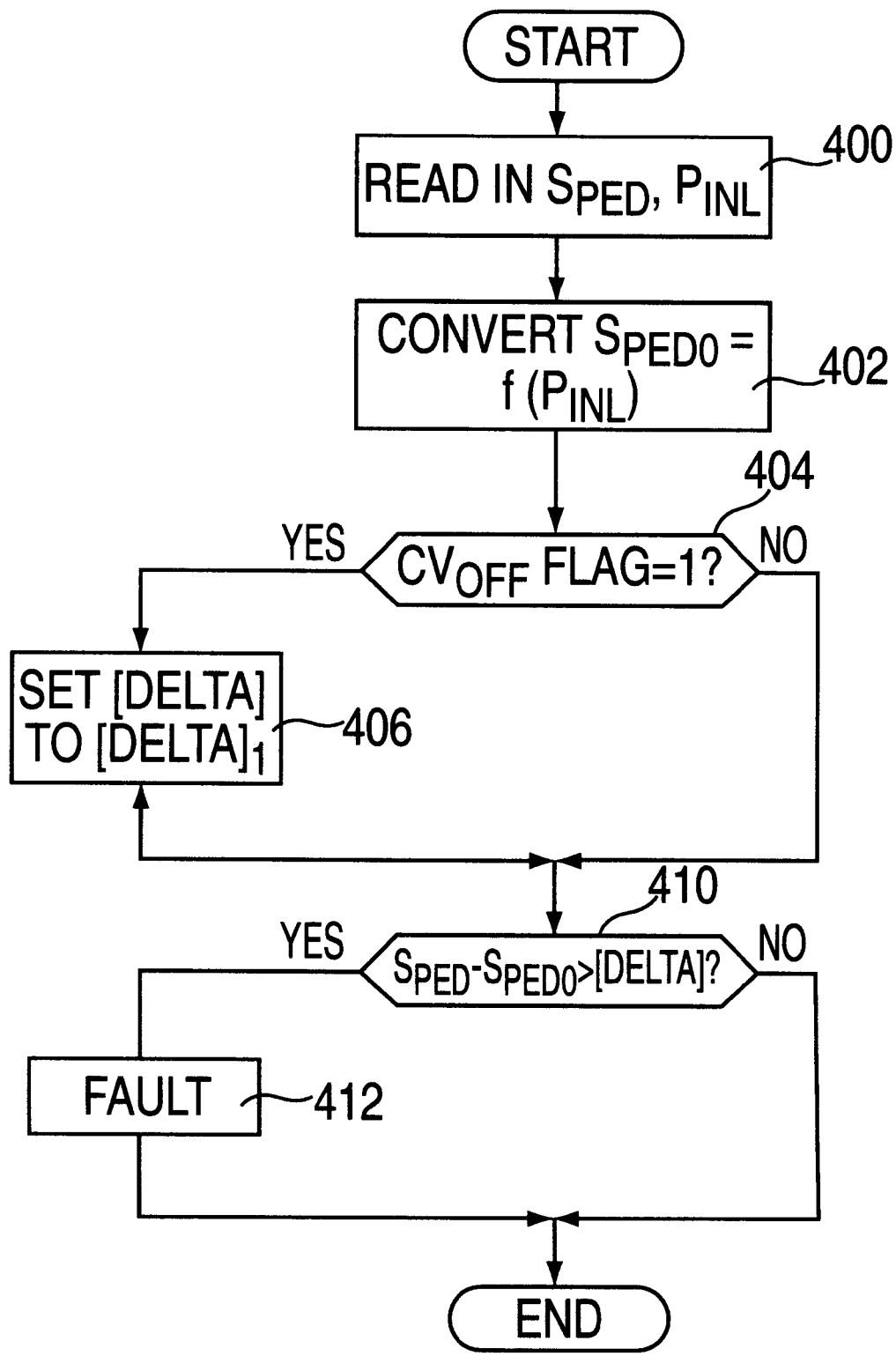
FIG. 6 is a flow diagram illustrating a program for monitoring the function of a main brake cylinder, according to an embodiment of the present invention.

The safety logic which proceeds from a fixed correlation between pedal travel and inlet pressure, and which is described in the existing art cited initially, can use information about the additional volume to correct or expand the tolerance in the correlation between pedal travel and inlet pressure. The tolerance before the volume reduction can thus be very low, and the tolerance after the volume reduction can be kept as low as possible. An example of an implementation as a calculation program, according to an embodiment of the present invention, is depicted in the flow diagram of FIG. 6.

This program is also started at defined points in time. In the first step 400, the pedal travel $S_{ped}$ and inlet pressure $P_{inl}$ are read in. In the subsequent step 402, the inlet pressure is converted into a pedal travel, or the pedal travel into an inlet pressure value. Then in step 404 a check is made as to whether the volume reduction flag $CV_{off}$ is set to 1. If so, then in step 406 the tolerance [Delta] is set to a value [Delta]$_1$. After step 406, or step 404 in the event of a negative answer, in step 410 the difference between the pedal travel values or inlet pressure values is monitored in terms of the tolerance [Delta]. If the difference in the values exceeds the defined tolerance, then in step 412 a fault is recognized; otherwise the program terminates after step 412. The fault monitoring function in step 410 of course includes filters so that the comparison can also be made under dynamic conditions. The flag for volume reduction is reset when the volume reduction is terminated.

What is claimed is:

1. A method for controlling a braking system of a vehicle, comprising the steps of:

detecting a braking input of a driver of the vehicle;

establishing, by at least one of an electrical control and an electrical regulation, a braking effect at at least one wheel brake as a function of the driver's braking input;

providing a capability for a conventional mechanical action by the driver on the at least one wheel brake, the conventional mechanical action being inhibited during an electrical operation of the braking system by at least one valve, the at least one valve being connected to a hydraulic line of the braking system; and briefly opening the at least one valve in at least one operating state in which an expansion of a volume of a pressure medium enclosed in the hydraulic line is expected.

2. The method according to claim 1, wherein the at least one operating state is present when the braking effect has been established for a predetermined period of time.

3. The method according to claim 1, wherein the at least one valve is open for a predetermined time upon an expiration of a defined minimum time after which first expansion effects of the enclosed pressure medium is expected.

4. The method according to claim 1, wherein the at least one valve is open when an electrical activation is off and the at least one valve is closed when the electrical activation is on.

5. The method according to claim 1, wherein the at least one valve is open when an electrical activation is on and the at least one valve is closed when the electrical activation is off.

6. The method according to claim 1, further comprising the steps of:

detecting a pressure along the hydraulic line both upstream and downstream of the at least one valve; and determining an opening time of the at least one valve according to flow rate parameters of the at least one valve and a detected pressure difference along the hydraulic line upstream and downstream of the at least one valve.

7. The method according to claim 6, wherein the opening time of the at least one valve is divided into multiple small opening time periods.

8. The method according to claim 1, further comprising the steps of:

estimating, from a temperature of the at least one wheel brake, the expansion of the volume of the pressure medium enclosed in the hydraulic line; and determining an opening time of the at least one valve from a temperature-dependent volume increase.

9. The method according to claim 1, further comprising the step of:

taking into account a volume reduction due to an open valve when detecting the driver's braking input.

10. The method according to claim 1, wherein a fixed correlation is defined between a brake pedal travel and an inlet pressure;

wherein a fault is detected when the fixed correlation is violated; and wherein a volume reduction of the enclosed pressure medium is taken into account.

11. An apparatus for controlling a braking system of a vehicle, comprising:

an electronic control unit, the electronic control unit receiving an indicator representing a brake pedal actuation by a driver of the vehicle;

at least one valve coupled to the control unit and connected to a hydraulic line of the braking system, the hydraulic line enclosing a pressure medium;

wherein the electronic control unit uses the indicator to determine a braking input of the driver;

wherein the control unit electronically establishes a braking effect at at least one wheel brake of the braking system as a function of the driver's braking input;

wherein the at least one valve inhibits a conventional mechanical action on the at least one wheel brake by the driver; and wherein in at least one operating state in which an expansion of the pressure medium is expected, the at least one valve is briefly opened in order to reduce the expansion of the pressure medium.

* * * * *